United States Patent
Kim et al.

(10) Patent No.: US 8,832,591 B2
(45) Date of Patent: Sep. 9, 2014

(54) GRID DISPLAY DEVICE AND GRID DISPLAY METHOD IN MOBILE TERMINAL

(71) Applicant: Inswave Systems Co., Ltd., Seoul (KR)

(72) Inventors: Wooglae Kim, Seoul (KR); Woong Park, Incheon (KR)

(73) Assignee: Inswave Systems Co., Ltd., Seoul (KR)

( * ) Notice: Subject to any disclaimer, the term of this patent is extended or adjusted under 35 U.S.C. 154(b) by 0 days.

(21) Appl. No.: 14/069,044

(22) Filed: Oct. 31, 2013

(65) Prior Publication Data

US 2014/0157190 A1    Jun. 5, 2014

(30) Foreign Application Priority Data

Nov. 30, 2012    (KR) .................. 10-2012-0137898

(51) Int. Cl.
*G06F 3/048* (2013.01)
*G06F 3/0485* (2013.01)
*G06F 3/00* (2006.01)

(52) U.S. Cl.
CPC .................. *G06F 3/04855* (2013.01)
USPC ............ 715/786; 715/781; 715/784; 715/788

(58) Field of Classification Search
CPC ..... G06F 3/016; G06F 3/0488; G06F 3/0482; G06F 3/0485; G06F 3/04855
USPC .................. 715/786, 781, 784, 788
See application file for complete search history.

(56) References Cited

U.S. PATENT DOCUMENTS

| | | | |
|---|---|---|---|
| 7,376,907 B2 * | 5/2008 | Santoro et al. | 715/765 |
| 7,437,005 B2 * | 10/2008 | Drucker et al. | 382/224 |
| 7,559,039 B2 * | 7/2009 | Ridgley et al. | 715/854 |
| 7,889,209 B2 * | 2/2011 | Berger et al. | 345/585 |
| 7,956,848 B2 * | 6/2011 | Chaudhri | 345/173 |
| 8,379,058 B2 * | 2/2013 | Kraut | 345/647 |
| 8,631,344 B2 * | 1/2014 | Hama et al. | 715/786 |
| 8,726,150 B2 * | 5/2014 | Sakata | 715/249 |
| 2007/0237032 A1 | 10/2007 | Rhee et al. | |
| 2009/0070711 A1 * | 3/2009 | Kwak et al. | 715/829 |
| 2010/0031193 A1 * | 2/2010 | Stark et al. | 715/810 |
| 2010/0077344 A1 * | 3/2010 | Gaffney et al. | 715/788 |
| 2010/0277496 A1 * | 11/2010 | Kawanishi et al. | 345/589 |
| 2012/0254790 A1 * | 10/2012 | Colombino et al. | 715/781 |

FOREIGN PATENT DOCUMENTS

| | | |
|---|---|---|
| JP | 2003-224633 A | 8/2003 |
| KR | 10-2006-0007852 A | 1/2006 |
| KR | 10-0714716 B1 | 5/2007 |
| KR | 10-2012-0034516 A | 4/2012 |

* cited by examiner

*Primary Examiner* — Nicholas Augustine (74) *Attorney, Agent, or Firm* — Birch, Stewart, Kolasch & Birch, LLP (57) ABSTRACT

A grid display device and a grid display method in a mobile terminal are provided. The grid display device in a mobile terminal includes a scroll control unit that displays a grid to be displayed on a screen of a display unit of the mobile terminal using a scroll bar when the grid is larger than the screen and a grid display unit that displays meshes of the grid on the screen and changes contents to be displayed in the fixed mesh of the grid in correspondence with a changed position of the scroll bar. According to the grid display device in a mobile terminal, it is possible to control a display of a grid so that the grid used in the mobile terminal having relatively low performance can rapidly operate.

18 Claims, 10 Drawing Sheets

| num | header_1 | header_2 | header_3 | header_4 |
|---|---|---|---|---|
| 1 | text | 100 | img | button |
| 2 | text | 200 | img | button |
| 3 | text | 300 | img | button |
| 4 | text | 400 | img | button |
| 5 | text | 500 | img | button |
| 6 | text | 600 | img | button |
| 7 | text | 700 | img | button |
| 8 | text | 800 | img | button |
| 9 | text | 900 | img | button |

Fig. 6

| num | header_1 | header_2 | header_3 | header_4 |
|-----|----------|----------|----------|----------|
| 4 | text | 400 | img | button |
| 5 | text | 500 | img | button |
| 6 | text | 600 | img | button |
| 7 | text | 700 | img | button |
| 8 | text | 800 | img | button |
| 9 | text | 900 | img | button |
| 7 | text | 700 | img | button |
| 8 | text | 800 | img | button |
| 9 | text | 900 | img | button |

Fig. 7

| num | header_1 | header_2 | header_3 | header_4 |
|-----|----------|----------|----------|----------|
| 4 | text | 400 | img | button |
| 5 | text | 500 | img | button |
| 6 | text | 600 | img | button |
| 7 | text | 700 | img | button |
| 8 | text | 800 | img | button |
| 9 | text | 900 | img | button |

Fig. 8

| num | header_1 | header_2 | header_3 | header_4 |
|---|---|---|---|---|
| 4 | text | 400 | img | button |
| 5 | text | 500 | img | button |
| 6 | text | 600 | img | button |
| 7 | text | 700 | img | button |
| 8 | text | 800 | img | button |
| 9 | text | 900 | img | button |
| 10 | text | 1000 | img | button |
| 11 | text | 1100 | img | button |
| 12 | text | 1200 | img | button |

Fig. 9

| num | header_1 | header_2 | header_3 | header_4 |
|-----|----------|----------|----------|----------|
| 4   | text     | 400      | img      | button   |
| 5   | text     | 500      | img      | button   |
| 6   | text     | 600      | img      | button   |
| 7   | text     | 700      | img      | button   |
| 8   | text     | 800      | img      | button   |
| 9   | text     | 900      | img      | button   |
| 10  | text     | 1000     | img      | button   |
| 11  | text     | 1100     | img      | button   |
| 12  | text     | 1200     | img      | button   |

Fig. 10

| num | header_1 | header_2 | header_3 | header_4 |
|---|---|---|---|---|
| 4 | text | 400 | img | button |
| 5 | text | 500 | img | button |
| 6 | text | 600 | img | button |
| 7 | text | 700 | img | button |
| 8 | text | 800 | img | button |
| 9 | text | 900 | img | button |
| 10 | text | 1000 | img | button |
| 11 | text | 1100 | img | button |
| 12 | text | 1200 | img | button |

GRID DISPLAY DEVICE AND GRID DISPLAY METHOD IN MOBILE TERMINAL

CROSS-REFERENCE TO RELATED APPLICATIONS

This application claims the benefit of Korean Patent Application No. 10-2012-0137898, filed with the Korean Intellectual Property Office on Nov. 30, 2012, the disclosure of which is incorporated herein by reference in its entirety.

BACKGROUND

1. Technical Field

The present invention relates to a grid display device and a grid display method in a mobile terminal.

2. Description of the Related Art

With the recent development of mobile communication technology, users can access the Internet using mobile phones and can use web pages. In this case, since mobile phones have lower performance such as data processing capacity and memory capacity than those of computers generally used by users, longer time is taken to construct a web screen and more limited contents are displayed, compared with the computers.

In the related art, there is a method for constructing web pages in mobile phones generally having a low rate and low performance. For example, Korean Patent Application Laid-open No. 2008-0101485 discloses a technique of providing information so as for a user to see information on accessibility and rate even when the user does not click a web page link area. In such a related art, a user can efficiently use a web page in a mobile communication terminal by determining whether corresponding information is accessible in advance.

However, the related art does not provide a technique capable of rapidly displaying a grid for providing a variety of information in a web page. Since a variety of information is provided through a web page of a mobile phone, it is necessary to effectively display a grid for clearly showing a variety of information.

The above-mentioned related art is technical information possessed to make the invention or learned in the course of making the invention by the inventor, and cannot thus be said to be technical information known to the public before filing the invention.

SUMMARY

An object of the invention is to provide a grid display device and a grid display method in a mobile terminal which can control a display of a grid used in the mobile terminal having relatively low performance so as for the grid to rapidly operate.

Other technical objects of the invention will be easily understood from the following description.

According to an aspect of the invention, there is provided a grid display device in a mobile terminal including: a scroll control unit that displays a grid to be displayed on a screen of a display unit of the mobile terminal using a scroll bar when the grid is larger than the screen; and a grid display unit that displays meshes of the grid on the screen and changes contents to be displayed in the mesh of the grid fixed to a specific position in correspondence with a changed position of the scroll bar.

Here, the grid display unit may include a mesh display unit that displays the meshes of the grid on the screen of the display unit, a content display unit that displays contents to be described in the meshes on the screen, and a mesh content changing unit that fixes the meshes and changes only the contents to be displayed in the meshes when the scroll bar moves, The mesh content changing unit may change a color of the meshes and a selected area in correspondence with the position specified by the scroll bar.

In this aspect, the grid display device in a mobile terminal may further include a specific area rendering unit that renders only the displayed contents of the grid corresponding to the position of the scroll bar when the grid to be displayed on the screen of the display unit is larger than the screen.

In this aspect, the grid display device in a mobile terminal may further include a set image processing unit that further renders corresponding areas of the contents to be described in the meshes specified in advance depending on a velocity or an acceleration of the scroll bar manipulated by a user.

Here, a non-imaged area of the contents corresponding to the moving state of the scroll bar is maintained in a non-imaged state.

The specific area rendering unit may render contents specified by the position of the scroll bar and contents of a previous page or a subsequent page to be displayed depending on the movement of the scroll bar when the grid to be displayed on the screen of the display unit is larger than the screen.

The grid display unit may further include an image creating unit that creates meshes of the grid and contents to be displayed in the meshes of the grid as an image.

The grid display unit may further include a function activating unit that dynamically creates components included in the contents created as an image and activates the functions of the components when a user clicks the components.

Here, the image creating unit may be a canvas tag.

In this aspect, the grid display device in a mobile terminal may further include: a basic FPS setting unit that sets a basic FPS (frame per second) at which the screen is to move depending on an OS of the mobile terminal; a maximum FPS measuring unit that measures a current maximum FPS of the mobile terminal; an FPS comparing unit that compares the basic FPS with the maximum FPS; and a use FPS setting unit that sets the smaller FPS of the basic FPS and the maximum FPS as an FPS to be used.

According to another aspect of the invention, there is provided a grid display method in a mobile terminal including the steps of displaying a grid to be displayed on a screen of a display unit of the mobile terminal using a scroll bar when the grid is larger than the screen; and displaying meshes of the grid on the screen and changing contents to be displayed in the mesh of the grid fixed to a specific position in correspondence with a changed position of the scroll bar.

Here, the step of changing the contents to be displayed may include the steps of displaying the meshes of the grid on the screen of the display unit, displaying contents to be described in the meshes on the screen, and fixing the meshes and changing only the contents to be displayed in the meshes when the scroll bar moves, and Here, the step of changing only the contents to be displayed may include changing a color of the meshes and a selected area in correspondence with the position specified by the scroll bar.

In this aspect, the grid display method in a mobile terminal may further include a step of rendering only the displayed contents of the grid corresponding to the position of the scroll bar when the grid to be displayed on the screen of the display unit is larger than the screen.

In this aspect, the grid display method in a mobile terminal may further include a step of further rendering corresponding areas of the contents to be described in the meshes specified in advance depending on a velocity or an acceleration of the scroll bar manipulated by a user.

Here, a non-imaged area of the contents corresponding to the moving state of the scroll bar may be maintained in a non-imaged state.

Contents specified by the position of the scroll bar and contents of a previous page or a subsequent page to be displayed depending on the movement of the scroll bar are rendered may be rendered when the grid to be displayed on the screen of the display unit is larger than the screen.

Here, the step of changing the contents to be displayed may further include a step of creating meshes of the grid and contents to be displayed in the meshes of the grid as an image.

The step of changing the contents to be displayed may further include a step of dynamically creating components included in the contents created as an image and activating the functions of the components when a user clicks the components.

In this aspect, the grid display method in a mobile terminal may further include: a step of setting a basic FPS (frame per second) at which the screen is to move depending on an OS of the mobile terminal; a step of measuring a current maximum FPS of the mobile terminal; a step of comparing the basic FPS with the maximum FPS; and a step of setting the smaller FPS of the basic FPS and the maximum FPS as an FPS to be used.

Other aspects, features, and advantages of the invention will become apparent from the accompanying drawings, the appended claims, and the detailed description.

The grid display device and the grid display method in a mobile terminal according to the invention can control a display of a grid used in the mobile terminal having relatively low performance so as for the grid to rapidly operate.

DETAILED DESCRIPTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

Terms including ordinal numbers such as "first" and "second" can be used to describe various elements, but the elements should not be limited to the terms. The terms are used only to distinguish an element from another.

If it is mentioned that an element is "coupled" or "connected" to another element, it should be understood that the element is directly coupled or connected to another element or still another element is interposed therebetween.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms such as "unit", "module", and "means" described in the specification mean units for performing at least one function or operation and can be embodied by hardware, by software, or by a combination of hardware and software.

In describing the invention with reference to the accompanying drawings, like elements will be referenced by like reference numerals or signs regardless of the drawing numbers, and description thereof will not be repeated. When it is determined that detailed description of known techniques involved in the invention makes the gist of the invention obscure, the detailed description thereof will not be made.

Figure 1:
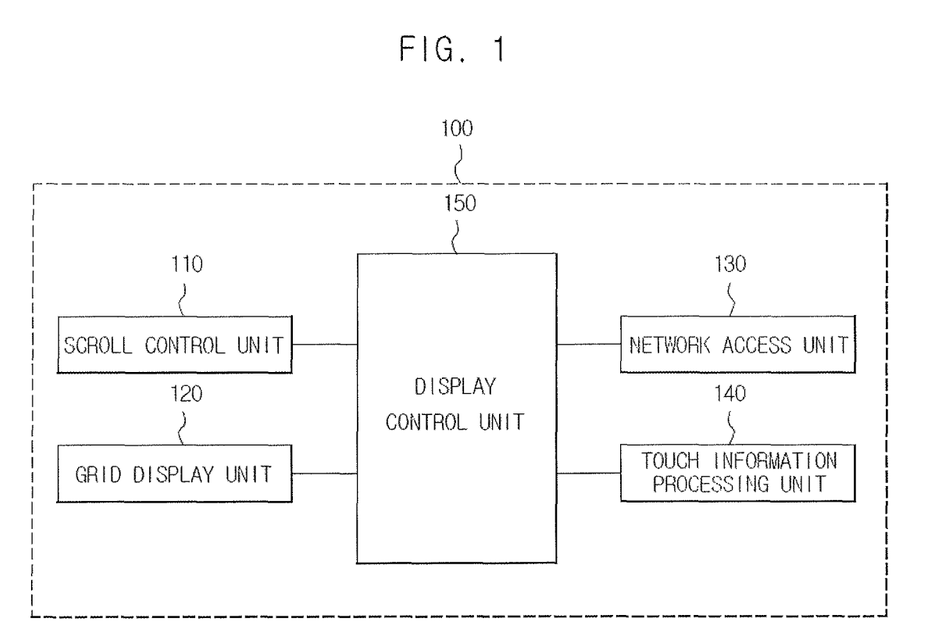
FIG. 1 is a block diagram illustrating a configuration of a grid display device in a mobile terminal according to an embodiment of the invention.

FIG. 1 is a block diagram illustrating a configuration of a grid display device in a mobile terminal according to an embodiment of the invention. As shown in FIG. 1, mobile terminal 100 includes a scroll control unit 110, a grid display unit 120, a network access unit 130, a touch information processing unit 140, and a display control unit 150.

This embodiment is characterized in that a display of a grid used in a mobile terminal having relatively low performance is controlled so that the grid can rapidly operate.

A grid is information providing means having a table shape used in a computer and includes meshes and contents described therein. In this embodiment, it is possible to more rapidly display a grid in a simple method using an idea that meshes are continuously displayed in the same pattern.

Screens to be described below may include screens of a program to be displayed in a mobile terminal and screens of web pages. For the purpose of convenience for explanation, screens of web pages to be displayed in a mobile terminal will be mainly described below.

The scroll control unit 110 displays a grid using a scroll bar when the grid to be displayed on the screen is larger than the screen of a display unit of the mobile terminal.

The mobile terminal is a small-size digital device having portability and examples thereof include devices having a communication function, such as a PDC (Personal Digital Cellular) phone, a PCS (Personal Communication Service) phone, a PHS (Personal Handy-phone System) phone, a CDMA-2000 (1X, 3X) phone, a WCDMA (Wideband CDMA) phone, a dual band/dual mode phone, a GSM (Global Standard for Mobile) phone, an MBS (Mobile Broadband System) phone, a DMB (Digital Multimedia Broadcasting) terminal, a smart phone, an OFDM (Orthogonal Frequency Division Multiplexing) terminal, and an OFDMA (Orthogonal Frequency Division Multiplexing Access) terminal.

The mobile terminal may be a computing apparatus having a general purpose or a specialized application, such as a hand-held PC, a notebook computer, a laptop computer, and a pad and examples thereof include terminals capable of predetermined computing operations by having a microprocessor performing a multimedia reproducing function mounted thereon.

The mobile terminal may be a terminal having an application providing the grid display method according to this embodiment or a program module having a function corresponding thereto mounted thereon so as to be operable.

The display unit of the mobile terminal may be a device that can display an image in various methods, such as a liquid crystal display (LCD), an organic light emitting diode (OLED), a 3D display, or other flexible displays.

The display unit of the mobile terminal according to this embodiment may have functions such as zoom-in of a screen, zoom-out of a screen, change of a screen, and scroll of a screen.

Contents to be displayed on the screen of the mobile terminal may be data downloaded from the Internet through the network access unit 130. The display unit of the mobile terminal may be embodied as a touch screen. In this case, the touch information processing unit 140 may sense a touched point on the screen and may process event information generated at the corresponding position.

The grid display unit 120 displays meshes of a grid on the screen and changes contents to be displayed in the fixed meshes of the grid depending on the changed position of the scroll bar.

In this embodiment, two or more screens may be embodied in the display unit and one screen thereof may be located inside the other screen. In this case, the inside screen may be a screen located inside the entire screen, for example, a window, and the outside screen may be a name relatively expressing a screen located outside the inside screen.

The grid in this embodiment may occupy the inside screen or the outside screen as a whole. Since the meshes of the grid can be maintained at the same interval between horizontally or vertically neighboring meshes, the meshes can be fixed at specific positions regardless of the change of the scroll bar. Here, when contents to be displayed in the fixed meshes are changed, a user actually watching the grid see the meshes as if the meshes moved in a specific direction.

The display control unit 150 controls the functional units so that the scroll control unit 110, the grid display unit 120, the network access unit 130, and the touch information processing unit 140 perform their inherent functions by interlocking with each other.

Figure 2:
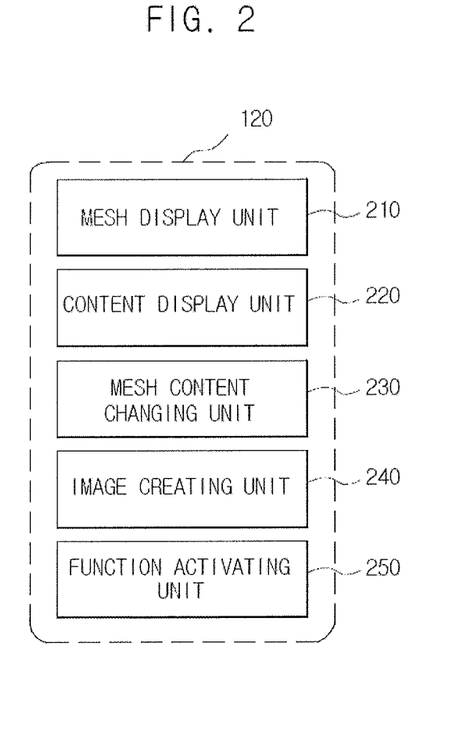
FIG. 2 is a block diagram illustrating a configuration of a grid display unit of the grid display device in a mobile terminal according to the embodiment of the invention.

FIG. 2 is a block diagram illustrating the configuration of the grid display unit of the grid display device in the mobile terminal according to the embodiment of the invention. As shown in FIG. 2, the grid display unit 120 includes a mesh display unit 210, a content display unit 220, a mesh content changing unit 230, an image creating unit 240, and a function activating unit 250.

The mesh display unit 210 displays meshes of a grid on the screen of the display unit. The meshes can form frames of a table in a web page or a mobile application. The mesh display unit 210 can display a mesh pattern on the screen using a predetermined inter-mesh distance, a predetermined number of rows, and a predetermined number of columns.

The content display unit 220 displays contents to be described in the meshes on the screen. The contents to be displayed in the meshes may include various contents such as images, texts (such as characters, signs, and numerals), and components.

The mesh content changing unit 230 fixes the meshes and changes only the contents to be displayed in the meshes, when a vertical or horizontal scroll bar created in a case where a grid is larger than the screen moves. Since the mobile terminal does not need to additionally render the meshes, it is possible to rapidly display a grid regardless of the performance thereof.

The mesh content changing unit 230 can change a color of the meshes corresponding to the position specified by the scroll bar and a selected area. That is, the contents to be displayed in the meshes may include the color of the meshes and the area marked to be selected. For example, when 10 meshes in the vertical direction are displayed on the entire screen, the color of the fifth mesh from the uppermost is gray, the boundary thereof is marked by a bold line to represent a selected mesh, and the scroll bar is pushed up to lower three meshes on the screen, the meshes are fixed, the color of the eighth mesh from the uppermost in the grid is gray, and the boundary thereof is marked by a bold line.

The image creating unit 240 renders the meshes of the grid and/or the contents to be displayed in the meshes of the grid as an image. Here, the image creating unit 240 may be a canvas tag. For example, the image creating unit 240 may be a canvas for creating an image in HTML5.

In this case, by displaying images, texts, meshes, components, and the like as an image, it is possible to more rapidly display the corresponding contents.

The function activating unit 250 dynamically creates a specific component rendered as an image and activates the function of the component when a user clicks the component. For example, when components such as buttons and check boxes are created as images by the image creating unit 240 and a user clicks a button, the function activating unit 250 can generate an event so as to activate the component corresponding to the clicked position and to push the corresponding button.

Another embodiment of the invention may include a specific area rendering unit (not shown) and a set image processing unit (not shown).

The specific area rendering unit renders only the content of the grid corresponding to the position of the scroll bar when the grid to be displayed on the screen of the display unit is larger than the screen. Here, the screen may be the inside screen and/or the outside screen. The contents may include various contents such as texts, images, and components.

The specific area rendering unit renders only the content corresponding to the current position indicated by the inside scroll bar on the screen in consideration of the data processing capacity of the mobile terminal instead of rendering the whole contents to be displayed on the screen.

The set image processing unit can further render the area corresponding to the content described in a mesh specified in advance depending on a velocity or an acceleration of the scroll bar manipulated by a user. For example, when the specific area rendering unit displays only a partial content on the screen and a user moves the inside scroll bar embodied in the inside screen, the set image processing unit can render only a specific area corresponding to the position where the scroll bar may stop instead of rendering all the images corresponding to all the positions at which the scroll bar moves.

The length of the scroll bar to be moved can be determined on the basis of the total length of the grid to be displayed on the screen, and the center of the scroll bar can be determined depending on the position of the content to be currently displayed out of the entire contents.

Here, the moving distance of the scroll bar may be determined depending on a velocity or an acceleration of the scroll bar manipulated by a user. That is, when the scroll bar is strongly scrolled by a user, the velocity and the acceleration are large and the stop position of the scroll bar can be determined depending on the manipulating state of the user.

Non-imaged areas in the contents corresponding to the moving state of the scroll bar can be maintained in a non-imaged state. That is, when the scroll bar moves by the user's manipulation, the contents corresponding to the positions through which the scroll bar passes does not need to be rendered and can be maintained in a non-imaged state. This method can be a method for more efficiently implementing the performance of the mobile terminal.

The scroll bar can be moved by a user's direct touch with a finger, by the use of a cursor of a mouse, or by the use of a wheel coupled to the mouse. In these cases, the velocity and the acceleration of the scroll bar may be changed depending on the user's manipulating method.

In another embodiment, it can be determined whether a non-imaged area should be maintained, depending on the state of the scroll bar. That is, when the velocity or the acceleration of the scroll bar manipulated by the user is larger than a predetermined threshold value, a non-imaged area of the contents corresponding to the intermediate moving path of the scroll bar can be maintained in the non-imaged state.

For example, even when a scroll bar moves slowly, it is necessary to show a user of contents of a grid and it is thus possible to display the content of the grid corresponding to the position of the scroll bar on the screen. Therefore, when a velocity or an acceleration of the scroll bar is larger than a threshold value of the velocity or the acceleration, an image corresponding to the contents is not visualized. When the velocity or the acceleration of the scroll bar is equal to or less than the threshold value, the image is visualized.

The scroll includes a vertical scroll of vertically moving the grid and a horizontal scroll of horizontally moving the grid.

In another embodiment, the area to be rendered may be formed to be larger than the above-mentioned range. A user often moves the current page to a previous page or a subsequent page. Accordingly, when the current page is imaged, the previous page and the subsequent page can be imaged together.

That is, when the grid to be displayed is larger than the screen, the inside image processing unit may render the content specified depending on the position of the scroll bar and the contents of the previous page and the subsequent page to be displayed depending on the movement of the scroll bar.

In another embodiment of the invention, a moving information measuring unit (not shown) measures a position at which the inside scroll bar should be stopped. The position of the inside scroll bar may be specified when a user touches and moves the scroll bar to a specific position, or may be specified when a user gives an acceleration to the scroll bar to move the scroll bar.

Here, the stop position of the scroll bar can be first specified by calculating the position using the velocity and the acceleration of the scroll bar. For example, the scroll bar has a predetermined resistive force against the moving direction thereof and the stop position of the scroll bar can be determined using the resistive force, the current velocity, and the current acceleration. The contents corresponding to the stop position of the scroll bar calculated in advance can be displayed on the screen.

A position corresponding unit (not shown) specifies contents to be displayed in correspondence with the stop position of the scroll bar. For example, by calculating the ratio of the stop position of the scroll bar to the length of the scroll and applying the calculated ratio to the length of the grid to specify the contents to be displayed, it is possible to display the grid on the screen.

The corresponding position rendering unit (not shown) can image a grid specified by the position corresponding unit (not shown) and output the imaged grid on the screen.

Figure 3:
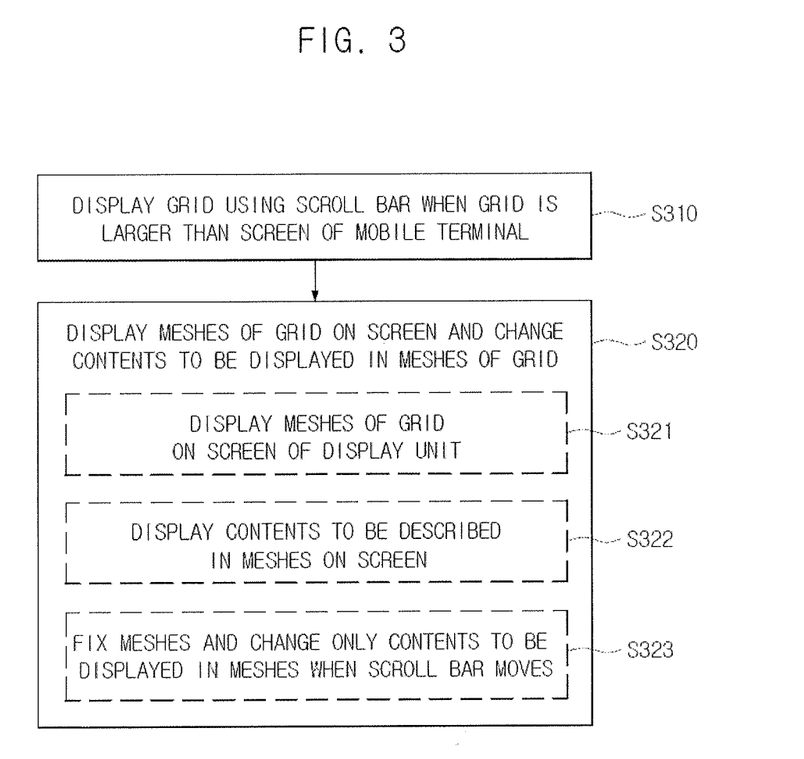
FIG. 3 is a flowchart illustrating a grid display method in a mobile terminal according to an embodiment of the invention.

FIG. 3 is a flowchart illustrating the grid display method in a mobile terminal according to an embodiment of the invention. The steps to be described below can be performed by the mobile terminal 100. The processes of the steps do not need to be performed sequentially in time series and a changed order of the steps belongs to the scope of the invention as long as it satisfies the gist of the invention.

In step S310, when a grid to be displayed is larger than the screen of the display unit of the mobile terminal, the grid is displayed using a scroll bar. The size of the scroll bar can be determined depending on the size of the grid and the area of the grid to be displayed can be determined depending on the position of the scroll bar.

In step S320, meshes of the grid are displayed on the screen and the contents to be displayed in the meshes of the grid fixed depending on the changed position of the scroll bar are changed.

Specifically, in step S321, meshes of the grid are displayed on the screen of the display unit. The meshes are fixed to the screen and are continuously rendered constantly. In step S322, contents to be described in the meshes are displayed on the screen.

In step S323, when the scroll bar moves vertically or horizontally, the meshes are fixed, that is, the meshes are not rendered again, and only the contents to be displayed in the meshes are changed, thereby displaying the grid as if the meshes move.

Figure 4:
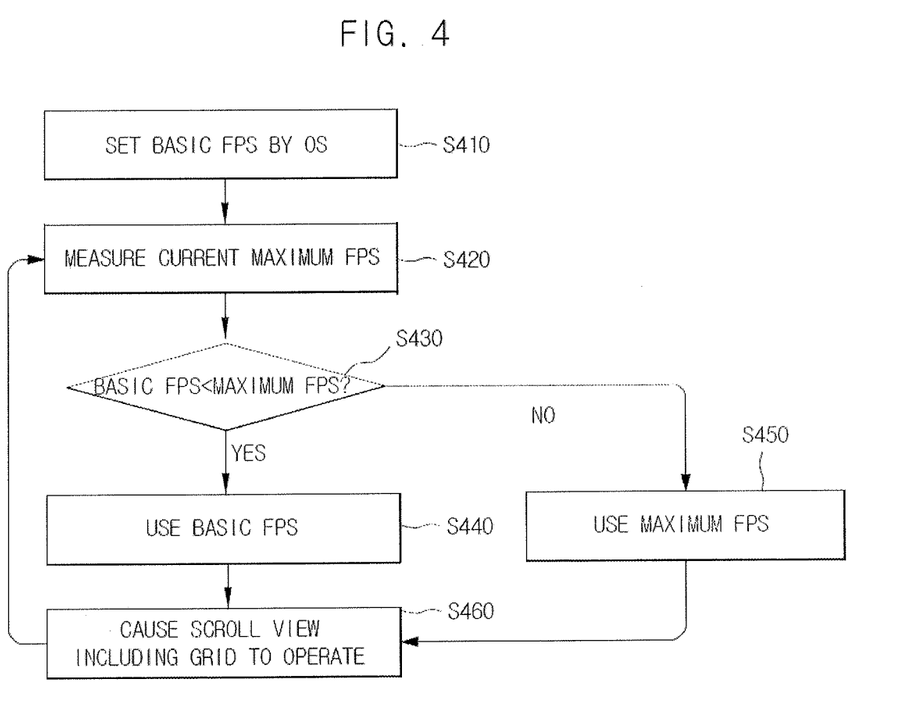
FIG. 4 is a flowchart illustrating a grid display method in a mobile terminal according to another embodiment of the invention.

FIG. 4 is a flowchart illustrating a grid display method in a mobile terminal according to another embodiment of the invention. This embodiment describes a method of calculating the optimal FPS (Frame Per Second) so as to smoothly scroll a screen when the screen as a scroll view is driven.

In step S410, a basic FPS setting unit sets a basic FPS at which a scroll view operates by an OS of the mobile terminal. For example, the basic FPS of iOS is set to 60 Hz and the basic FPS of Android is set to 60 Hz. The basic FPS is a processing rate which is set so as for a scroll view as an inside screen to smoothly operate in a web page.

In step S420, a maximum FPS measuring unit measures a current maximum FPS of the mobile terminal. In step S430, an FPS comparing unit compares the basic FPS with the maximum FPS. When the maximum FPS is equal to or more than the basic FPS, the scroll view can operate at the basic FPS without overstrain. Accordingly, in step S440, a user FPS setting unit sets the basic FPS as an FPS to be used.

However, when the maximum FPS is smaller than the basic FPS, the operation of the scroll view at the basic FPS may overstrain the mobile terminal. Accordingly, in step S450, the use FPS setting unit sets the maximum FPS as an FPS to be used.

In step S460, a screen constructing unit causes the scroll view to operate at the set FPS.

The grid display device and the grid display method in a mobile terminal have been schematically described above with reference to the block diagrams and the flowcharts, and a specific embodiment where a grid is displayed in a mobile terminal according to the invention will be described below. This embodiment is associated with a technique of allowing the image creating unit 240 to rapidly display a screen, but the invention is not limited to the embodiment.

FIGS. 5 to 10 show screens sequentially displayed in accordance with the grid display method in the mobile terminal according to the embodiment of the invention. The screens can be created as images by a canvas of HTML5 in web pages and may be a whole screen of a web page or an inside screen located inside the whole screen. When specific codes are generated using a canvas function of Java script, the canvas draws a screen including images for each frame.

Figure 5:
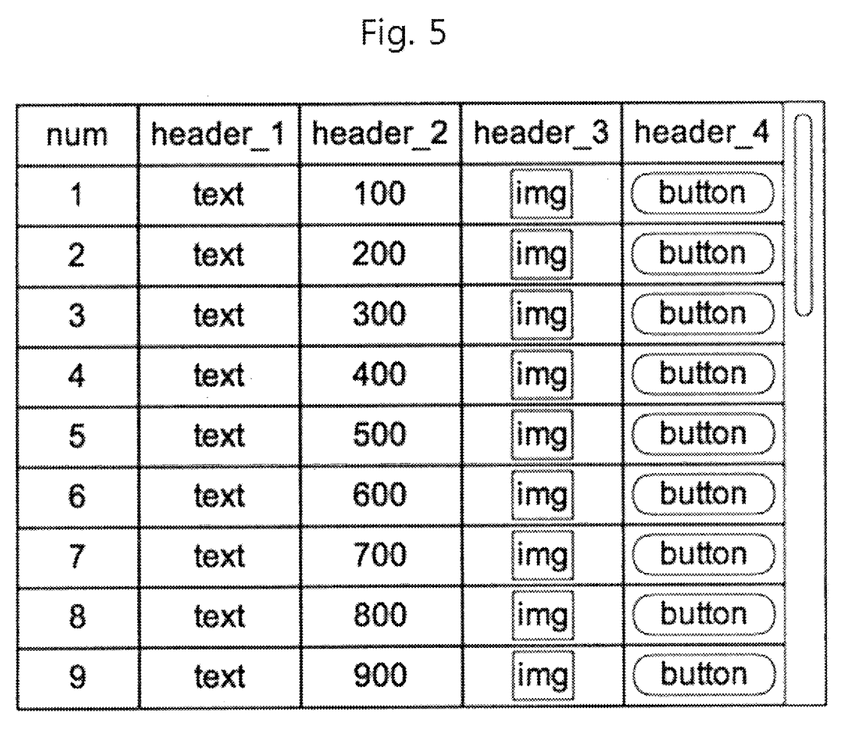
FIGS. 5 to 10 are diagrams illustrating screens sequentially displayed using the grid display method in a mobile terminal according to the embodiment of the invention.

Referring to FIG. 5, plural images, labels, edit boxes, and buttons are displayed as images at the first time by the canvas.

Figure 6:
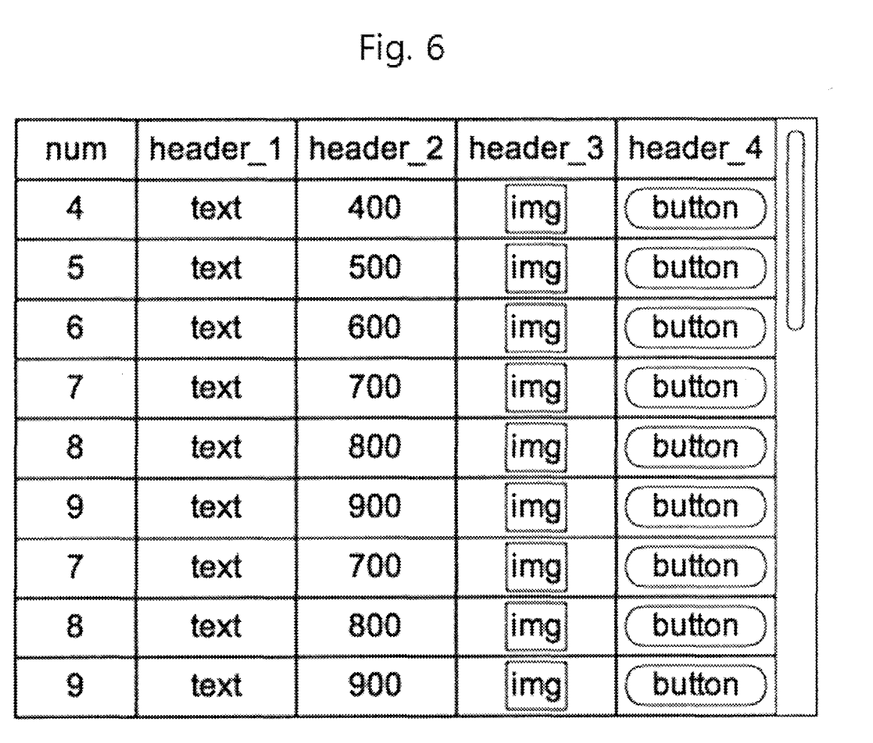
Figure 7:
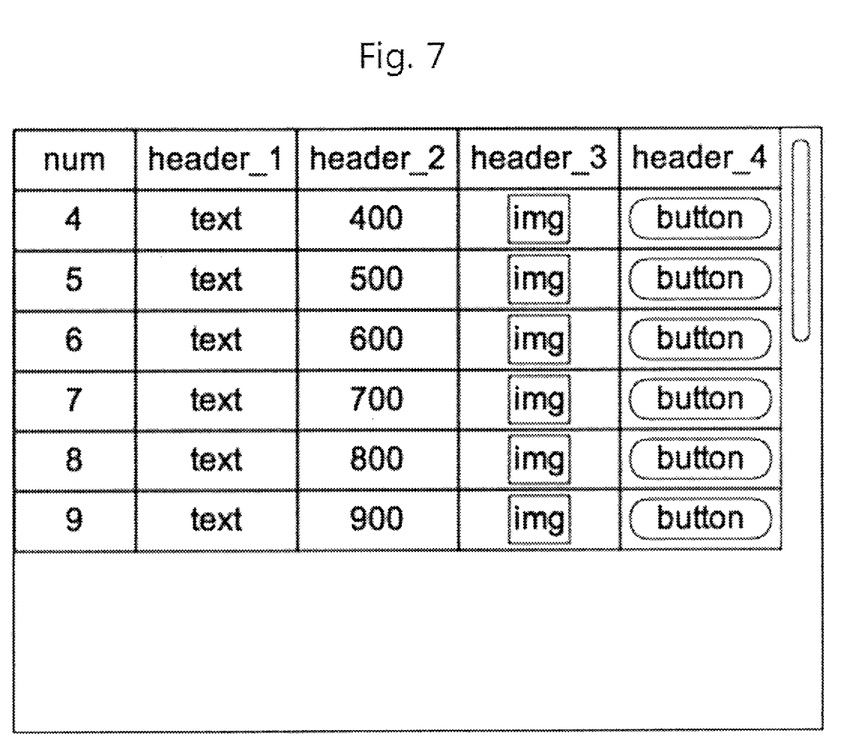
Figure 8:
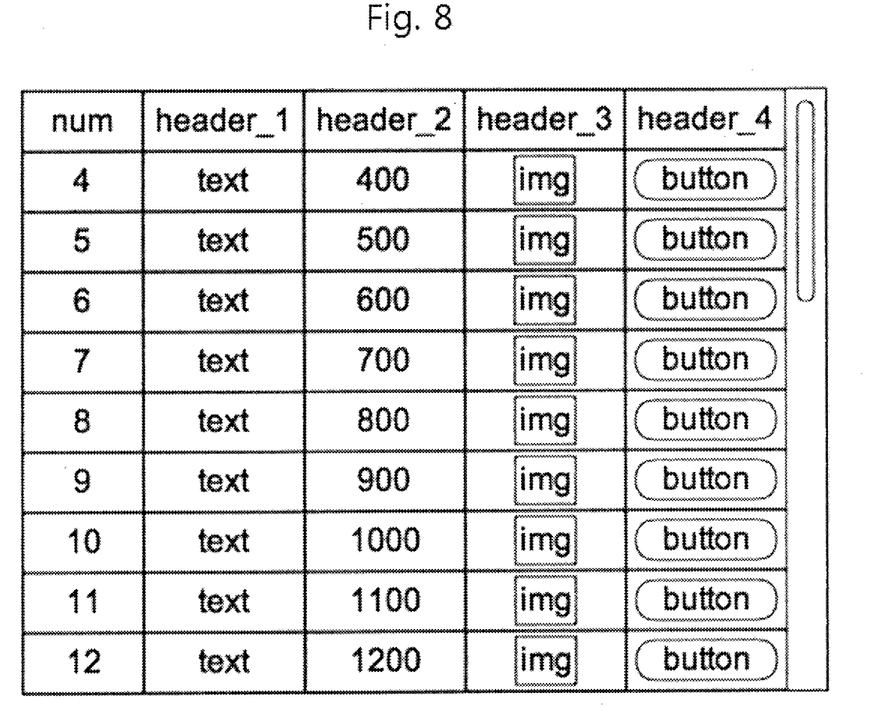

Referring to FIGS. 6 to 8, the screens varying when a user scrolls down a vertical scroll bar are sequentially shown. Rows corresponding to 1 to 3 in "num" disappear and rows corresponding to 10 to 12 in "num" in a subsequent page of the current page appear as images in the screen by the canvas. In this case, meshes of the grid formed and displayed up to now remain and only images, labels, edit boxes, button, and the like to be displayed in the meshes are newly drawn.

Figure 9:
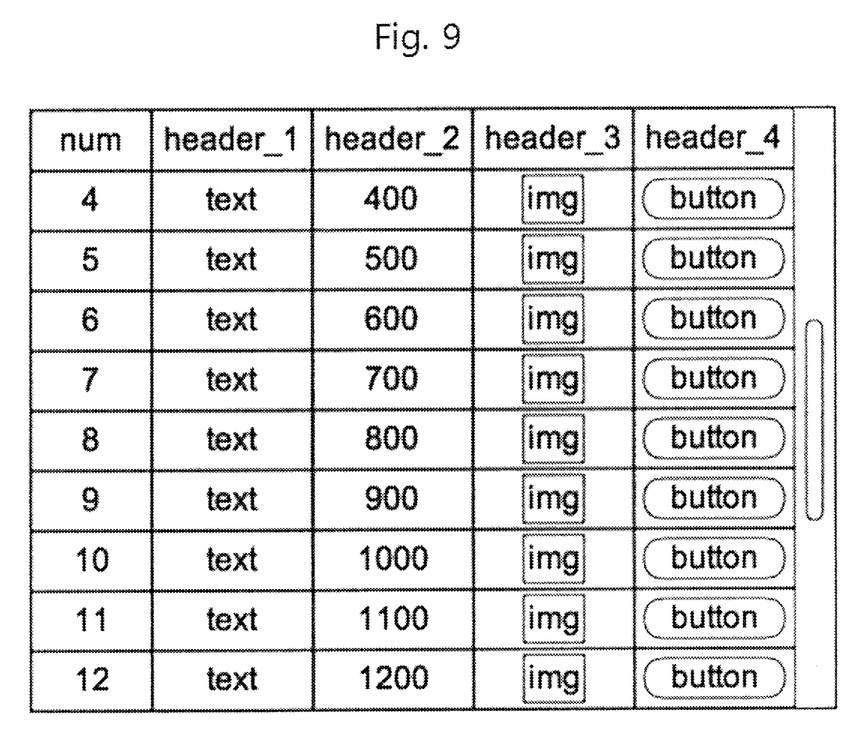

Referring to FIG. 9, the scroll bar stops at a position specified by a user. As described above, in this embodiment, the position to which the scroll bar moves can be calculated in advance and contents corresponding to the calculated position can be created as an image and can be rapidly displayed for the user.

Figure 10:
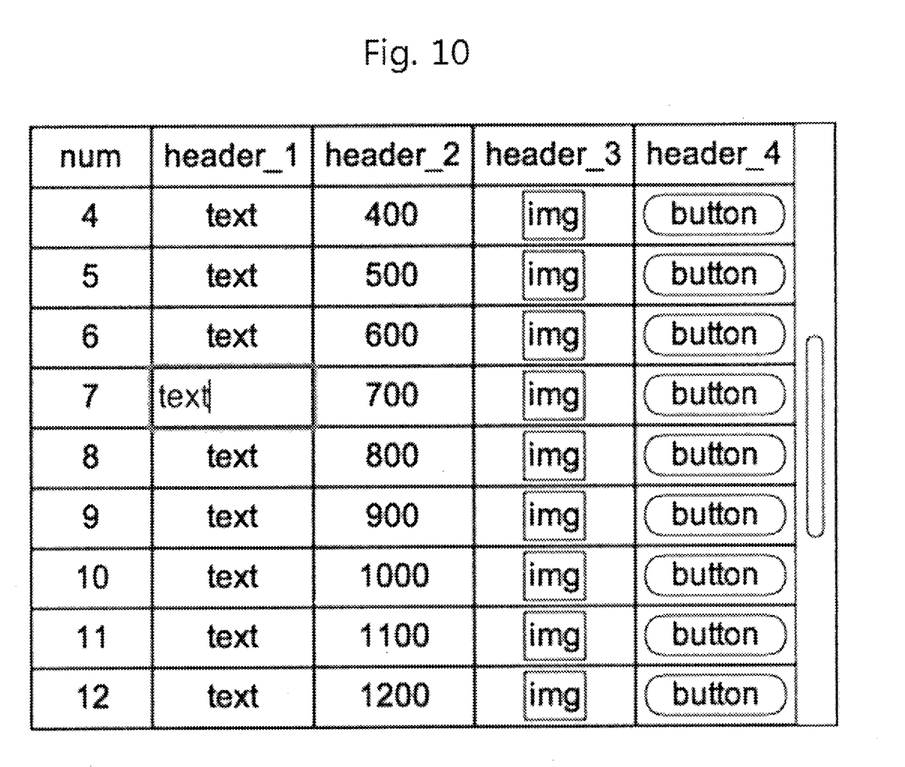

Referring to FIG. 10, when a user clicks a specific component displayed as an image, the clicked component can be activated and can be rendered again as a component for performing the inherent function. For example, when a user clicks an edit box (component in which "text" is described) formed as an image, the edit box is rendered again and a cursor is located therein so as to input texts therein.

Common platform techniques such as a specific system configuration of the grid display device in the mobile terminal according to the embodiment of the invention, an embedded system thereof, and an O/S, and interface standardizing techniques such as communication protocols and an I/O interface are obvious to those skilled in the art and thus will not be described.

The grid display method in the mobile terminal according to the embodiment of the invention may be embodied in the form of program commands which can be executed by various computing means and may be recorded on a computer-readable medium. That is, the recording medium may be a computer-readable recording medium having recorded thereon a program causing a computer to perform the above-mentioned steps.

The computer-readable recording medium may include program commands, data files, and data structures alone or in combinations. The program commands recorded on the recording medium may be specially designed and constructed for the invention or may be known and used to and by computer programmers skilled in the art. Examples of the computer-readable recording medium include magnetic recording media such as a hard disk, a floppy disk, and a magnetic tape, optical recording media such as a CD-ROM and a DVD, magneto-optical media such as a floptical disk, and hardware devices specially constructed to store and execute program commands, such as a ROM, a RAM, and a flash memory.

The elements and/or functions described in the above-mentioned embodiments may be embodied in a complex-combined manner, and it should be understood by those skilled in the art that the invention can be changed and modified in various forms without departing from the spirit and scope of the invention described in the appended claims.

What is claimed is:

1. A grid display device in a mobile terminal comprising:
   a scroll control unit that displays a grid to be displayed on a screen of a display unit of the mobile terminal using a scroll bar when the grid is larger than the screen; and
   a grid display unit that displays meshes of the grid on the screen and changes contents to be displayed in the meshes of the grid fixed to a specific position in correspondence with a changed position of the scroll bar,
   wherein the grid display unit includes
   a mesh display unit that displays the meshes of the grid having the same interval on the screen of the display unit,
   a content display unit that displays contents to be described in the meshes on the screen, and
   a mesh content changing unit that maintains the meshes in a state where the meshes are not newly rendered and changes only the contents to be displayed in the meshes when the scroll bar moves, and
   wherein the mesh content changing unit changes a color of the meshes maintained in the state where the meshes are not newly rendered and a selected area in correspondence with the position specified by the scroll bar when the scroll bar moves.

2. The grid display device in a mobile terminal according to claim 1, further comprising a specific area rendering unit that renders only the displayed contents of the grid corresponding to the position of the scroll bar when the grid to be displayed on the screen of the display unit is larger than the screen.

3. The grid display device in a mobile terminal according to claim 2, further comprising a set image processing unit that further renders corresponding areas of the contents to be described in the meshes specified in advance depending on a velocity or an acceleration of the scroll bar manipulated by a user.

4. The grid display device in a mobile terminal according to claim 3, wherein a non-imaged area of the contents corresponding to the moving state of the scroll bar is maintained in a non-imaged state.

5. The grid display device in a mobile terminal according to claim 2, wherein the specific area rendering unit renders contents specified by the position of the scroll bar and contents of a previous page or a subsequent page to be displayed depending on the movement of the scroll bar when the grid to be displayed on the screen of the display unit is larger than the screen.

6. The grid display device in a mobile terminal according to claim 1, wherein the grid display unit further includes an image creating unit that creates the meshes of the grid and contents to be displayed in the meshes of the grid as an image.

7. The grid display device in a mobile terminal according to claim 6, wherein the grid display unit further includes a function activating unit that dynamically creates components included in the contents created as an image and activates the functions of the components when a user clicks the components.

8. The grid display device in a mobile terminal according to claim 6, wherein the image creating unit is a canvas tag.

9. The grid display device in a mobile terminal according to claim 1, further comprising:
   a basic FPS setting unit that sets a basic FPS (frame per second) at which the screen is to move depending on an OS of the mobile terminal;
   a maximum FPS measuring unit that measures a current maximum FPS of the mobile terminal;
   an FPS comparing unit that compares the basic FPS with the maximum FPS; and
   a use FPS setting unit that sets the smaller FPS of the basic FPS and the maximum FPS as an FPS to be used.

10. A grid display method in a mobile terminal comprising the steps of:
    displaying a grid to be displayed on a screen of a display unit of the mobile terminal using a scroll bar when the grid is larger than the screen; and
    displaying meshes of the grid on the screen and changing contents to be displayed in the meshes of the grid fixed to a specific position in correspondence with a changed position of the scroll bar, wherein the step of changing the contents to be displayed includes the steps of displaying the meshes of the grid having the same interval on the screen of the display unit, displaying contents to be described in the meshes on the screen, and maintaining the meshes in a state where the meshes are not newly rendered and changing only the contents to be displayed in the meshes when the scroll bar moves, and wherein a color of the meshes and a selected area are changed in correspondence with the position specified by the scroll bar.

11. The grid display method in a mobile terminal according to claim 10, further comprising a step of rendering only the displayed contents of the grid corresponding to the position of the scroll bar when the grid to be displayed on the screen of the display unit is larger than the screen.

12. The grid display method in a mobile terminal according to claim 11, further comprising a step of further rendering corresponding areas of the contents to be described in the meshes specified in advance depending on a velocity or an acceleration of the scroll bar manipulated by a user.

13. The grid display method in a mobile terminal according to claim 12, wherein a non-imaged area of the contents corresponding to the moving state of the scroll bar is maintained in a non-imaged state.

14. The grid display method in a mobile terminal according to claim 11, wherein contents specified by the position of the scroll bar and contents of a previous page or a subsequent page to be displayed depending on the movement of the scroll bar are rendered when the grid to be displayed on the screen of the display unit is larger than the screen.

15. The grid display method in a mobile terminal according to claim 10, wherein the step of changing the contents to be displayed further includes a step of creating the meshes of the grid and contents to be displayed in the meshes of the grid as an image.

16. The grid display method in a mobile terminal according to claim 15, wherein the step of changing the contents to be displayed further includes a step of dynamically creating components included in the contents created as an image and activating the functions of the components when a user clicks the components.

17. The grid display method in a mobile terminal according to claim 15, wherein the image is an image created by a canvas tag.

18. The grid display method in a mobile terminal according to claim 10, further comprising:

a step of setting a basic FPS (frame per second) at which the screen is to move depending on an OS of the mobile terminal;

a step of measuring a current maximum FPS of the mobile terminal;

a step of comparing the basic FPS with the maximum FPS; and a step of setting the smaller FPS of the basic FPS and the maximum FPS as an FPS to be used.

* * * * *